(12) United States Patent
François et al.

(10) Patent No.: US 6,201,184 B1
(45) Date of Patent: Mar. 13, 2001

(54) OVERHEAD ELECTRICAL POWER LINE SUSPENSION

(75) Inventors: Pierre François, Limoges; Michel Saurina, Pompadour, both of (FR)

(73) Assignee: Societe Industrielle de Construction d'Appareils et de Materiel Electriques S.I.C.A.M.E., Arnac Pompadour (FR)

( * ) Notice: Subject to any disclaimer, the term of this patent is extended or adjusted under 35 U.S.C. 154(b) by 0 days.

(21) Appl. No.: 09/200,600

(22) Filed: Nov. 27, 1998

(51) Int. Cl.[7] ....................................... H02G 7/00
(52) U.S. Cl. ........................... 174/43; 174/40 R; 174/41; 174/42
(58) Field of Search .............................. 174/40 R, 40 TD, 174/40 CC, 46, 70 R, 70 C, 44, 41, 42, 137 R, 138 R, 43

(56) References Cited

U.S. PATENT DOCUMENTS

| 3,155,354 | 11/1964 | Lindsey | 248/63 |
| 3,664,620 | * 5/1972 | Branum | 248/63 |
| 3,729,575 | * 4/1973 | Harding et al. | 174/138 R |
| 4,113,979 | * 9/1978 | Torr et al. | 174/42 |
| 5,850,056 | * 12/1998 | Harwath | 174/40 CC |
| 6,043,433 | * 3/2000 | Schweitzer, Jr. | 174/70 R |

FOREIGN PATENT DOCUMENTS

| 2478246 | * 9/1981 | (FR) . | |
| 9426012 | 11/1994 | (WO) | H20G/7/05 |
| 9707579 | 2/1997 | (WO) | H02G/7/05 |

* cited by examiner

*Primary Examiner*—Kristine Kincaid
*Assistant Examiner*—W. David Walkenhorst
(74) *Attorney, Agent, or Firm*—Young & Thompson

(57) ABSTRACT

For locally supporting an overhead electrical power line, a suspension includes a suspension clamp, the bottom part of which is open laterally and forms a cradle which is associated with a pivoting clamping assembly. The suspension clamp includes, in addition to the clamping system, a pivoting closure clamp which closes the cross-section of the bottom part when required. Applications include installing and supporting low-voltage overhead electrical power lines formed of insulated cables.

31 Claims, 4 Drawing Sheets

OVERHEAD ELECTRICAL POWER LINE SUSPENSION

BACKGROUND OF THE INVENTION

1. Field of the Invention

The present invention is generally concerned with suspensions of the type used to support overhead electrical power lines, for example.

It is more particularly directed to the situation in which, forming part of a low-voltage electrical power distribution network, the overhead electrical power line to be supported is formed of four insulated cables twisted together, namely three phase cables and one neutral cable.

2. Description of the Prior Art

The suspensions which support an overhead electrical power line of the above kind at each of the posts between which it runs include a support which is fixed to the post, in the form of a bracket or a hook, for example, and a suspension clamp that is adapted to receive the overhead electrical power line and which is suspended from the support either directly, in particular if the support is a hook, or indirectly, for example by means of a shackle, if it is a bracket.

A suspension of the above type is described in French patent 2 478 246 filed Mar. 13, 1980 as application 80 05609, for example.

As described in the above French patent, the suspension clamp has a top part by means of which it is adapted to be suspended from the corresponding support and a bottom part by means of which it is adapted to receive at least a portion of the overhead electrical power line to be suspended, the bottom part having an open cross-section and forming an elongate cradle below the opening, a clamping system associated with the cradle pivoting about an axis parallel to the lengthwise direction of the cradle.

Until now suspensions of the above type have been used only to support the overhead electrical power line concerned, and not for the drawing operation required to install it.

At present this drawing operation is carried out using pay-out pulleys temporarily attached to the posts, one per post, below the corresponding suspension clamps, and it is only afterwards that the overhead electrical power line is transferred from the pay-out pulleys to the suspension clamps.

The pay-out pulleys used for this operation are dedicated to their function and therefore have an opening yoke which makes them relatively complex and costly.

They therefore require a non-negligible investment for their manufacture and maintenance and they are relatively costly in terms of labour to fit and to remove.

Accordingly, it is desirable to be able to dispense with at least some of the pay-out pulleys, given that those at the ends of the overhead electrical power line to be installed, i.e. that immediately downstream of the pay-out cable drum and that immediately upstream of the drawing capstan, can normally only be conserved.

At present only one of the cables constituting the overhead electrical power line is engaged in the suspension clamp of one of the suspensions, namely its neutral cable, which then serves as a supporting cable for the associated phase cables.

It is now desirable for a suspension clamp of the above kind to be able to receive all of the cables of the overhead electrical power line to be supported.

SUMMARY OF THE INVENTION

The present invention consists in a suspension clamp adapted to receive all of the cables of an overhead electrical power line and suitable for drawing the line so that it can advantageously be substituted for a drawing pulley; it also consists in any suspension including a suspension clamp of the above kind.

The suspension clamp in accordance with the invention is of the kind including a top part adapted to be suspended from a support and a bottom part adapted to receive at least a portion of the overhead electrical power line to be suspended, the bottom part having an open cross-section and below its opening forming an elongate cradle with, associated with the cradle, a clamping system pivoting about an axis parallel to the lengthwise direction of the cradle, characterized in that it includes, in addition to the clamping system, a closing clamp pivoting about an axis parallel to the lengthwise direction of the cradle and adapted to close the cross-section of the bottom part when required, extending from one of the two ends thereof to the other.

The closure clamp provided in accordance with the invention advantageously enables the bottom part of the suspension clamp to be opened, enabling the overhead electrical power line to be paid out to be placed in it, and then the bottom part to be closed before the cable is drawn, preventing the overhead electrical power line that is being drawn escaping unintentionally from the bottom part.

However, unlike a clamping system, the closure clamp in accordance with the invention is advantageously at a distance from the overhead electrical power line during drawing so that the line is entirely free to slide in the manner needed for it to be paid out correctly.

It is only when drawing has been completed that the associated clamping system is operated to hold in position the overhead electrical power line installed in the above manner.

Nesting means are preferably provided in a complementary fashion on the suspension clamp and on the closure clamp for cooperation of the nesting means by relative interengagement with each other when the closure clamp is in the closed position.

Firm and reliable locking of the closure clamp to the suspension clamp in the transverse and longitudinal directions is therefore obtained when the closure clamp is in the closed position through cooperation with a clamping screw controlling the closure clamp, in a manner that is very simple but highly effective.

This makes paying out safe.

The cradle that forms the bottom part of the suspension clamp in accordance with the invention preferably flares outwards at each end to facilitate the paying out of an overhead electrical power line during drawing and for an optimum fit to the inherent shape of the line after drawing, so protecting the overhead electrical power line in both cases.

The suspension clamp in accordance with the invention is preferably made from an insulative synthetic material, as is the shackle that may be used between it and the support from which the combination is suspended, which is beneficial to good insulation of the overhead electrical power line concerned from the support, whilst exploiting relative elasticity of the insulative synthetic material to facilitate the production and/or the fitting of some of the components concerned, which fitting can include snap fastening, for example.

Finally, because it can be suspended from a bracket or from a hook and because its clamping system can adapt to different overhead electrical power line diameters, the suspension clamp in accordance with the invention is advantageously of virtually universal application to a great many different situations.

The features and advantages of the invention will become more apparent in the following description given by way of example and with reference to the accompanying diagrammatic drawings.

DETAILED DESCRIPTION OF THE PREFERRED EMBODIMENTS

Figure 1:
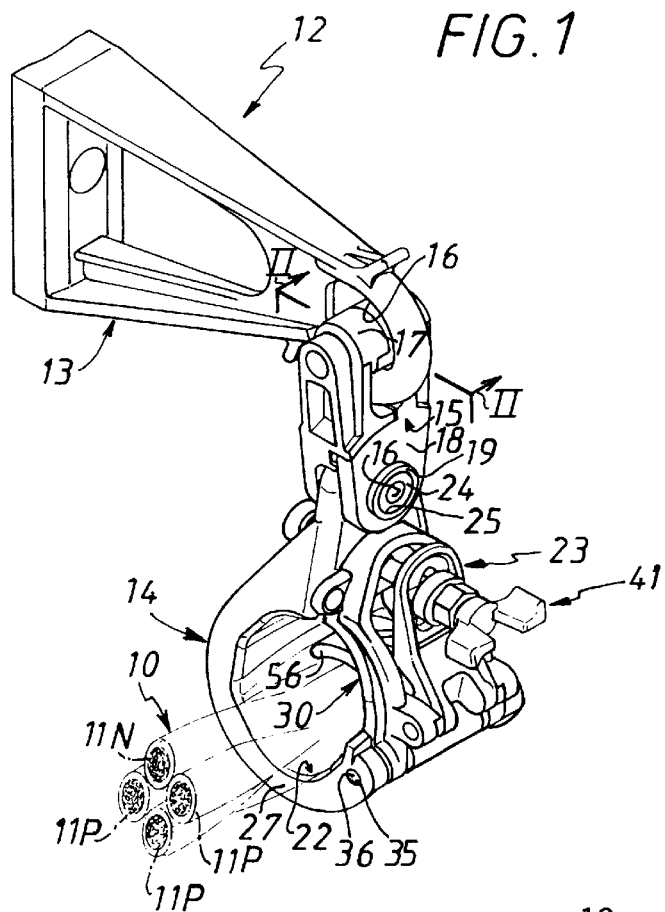
FIG. 1 is a perspective view of a suspension including a suspension clamp in accordance with the invention

As shown diagrammatically in dashed line in FIG. 1 and as shown in continuous line in FIGS. 11A, 11B, 11C and 12, the overall aim is to ensure localized support of an overhead electrical power line 10 which, in the embodiments shown, is formed of four cables 11P, 11N twisted together, namely three phase cables 11P and one neutral cable 11N.

A suspension 12 is used on each of the posts concerned for localized support of the overhead electrical power line 10, in a manner that is known in itself.

In a manner that is also known in itself the suspension 12 includes a support 13 which is adapted to be fixed to the corresponding post and a suspension clamp 14 suspended from the support 13 either directly or indirectly.

In the embodiments more particularly shown in FIGS. 1 through 17 the support 13 is a bracket and the suspension clamp 14 is suspended indirectly from it via a shackle 15.

A support 13 of the above kind and a shackle 15 of the above kind will not be described in detail here because they are well known in themselves, in particular from French patent 80 05609 mentioned hereinabove.

Concerning the support 13, suffice to say that it includes an eyelet 16 for hooking the shackle 15 onto.

Concerning the shackle 15, which is an openable shackle, suffice to say that its top part forms a pin 17 for hooking it onto the support 13 and its bottom part forms a yoke 18 with a transverse bore 19 through it for hooking the suspension clamp 14 onto.

In a manner that is known in itself the suspension clamp 14 includes a top part 14A adapted to be suspended from a support, here from the support 13 by way of the shackle 15, and a bottom part 14B adapted to receive at least a portion of the overhead electrical power line 10 to be suspended, here all of it, the bottom part 14B having a cross-section that is open laterally in the top portion, its bottom portion forming an elongate cradle 22 below the opening 20. As described in more detail below, a clamping system 23 pivoting about an axis A1 parallel to the lengthwise direction D of the cradle 22 is associated with the cradle 22.

Figure 2:
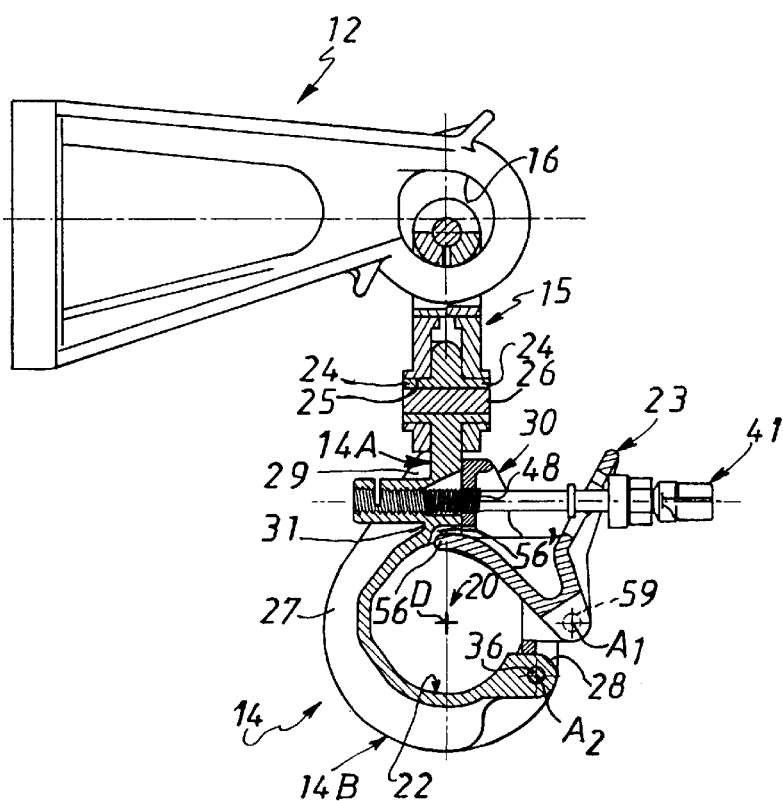
FIG. 2 is a view partly in elevation and partly in cross-section taken along the line II—II in FIG. 1.
Figure 3:
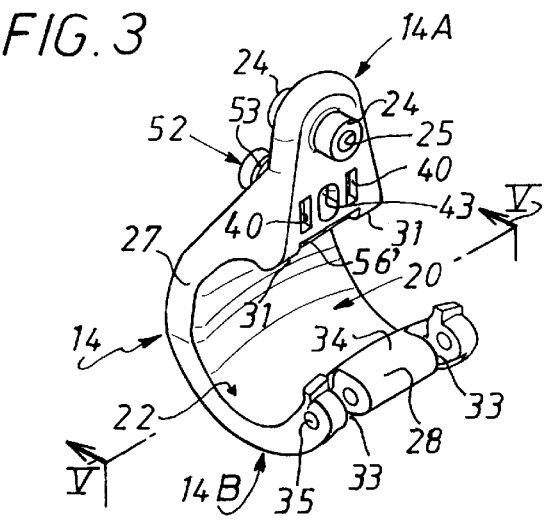
FIG. 3 is a perspective view of the suspension clamp in accordance with the invention as seen from the front.
Figure 4:
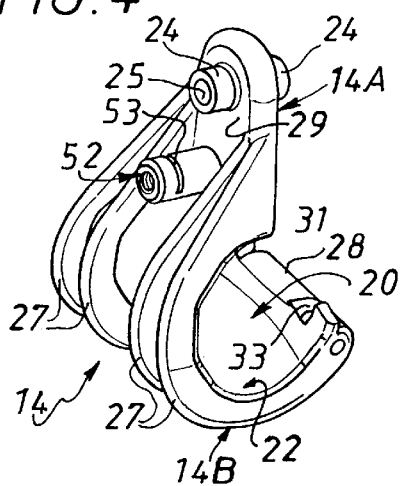
FIG. 4 is a perspective view of the suspension clamp as seen from the rear.
Figure 11A:
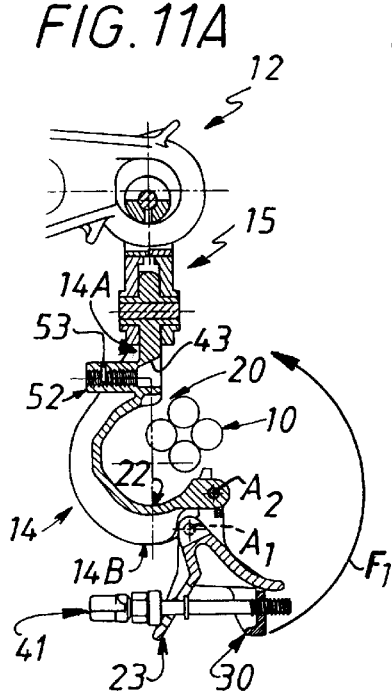
FIGS. 11A, 11B, 11C are partial elevation views in section similar to that of FIG. 2, to a smaller scale, illustrating various successive phases in the use of the suspension clamp in accordance with the invention for a given diameter of the overhead electrical power line concerned.
Figure 11B:
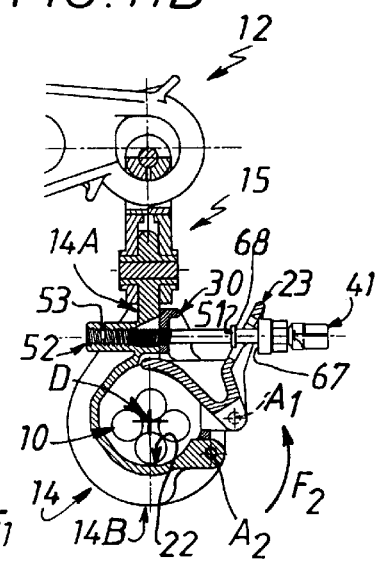

The pivot axis A1 of the clamping system 23 and the lengthwise direction D of the cradle 22 are shown in FIGS. 2 and 11B.

Figure 5:
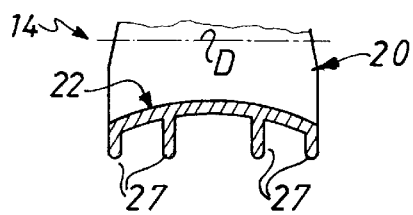
FIG. 5 is a partial view of the suspension clamp to a different scale and in longitudinal section taken along the line V—V in FIG. 3.
Figure 6:
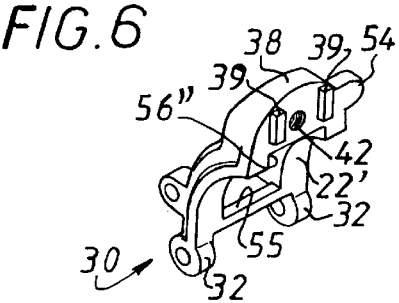
FIG. 6 is a perspective view of the closure clamp incorporated in the suspension clamp in accordance with the invention, as seen from the front.
Figure 7:
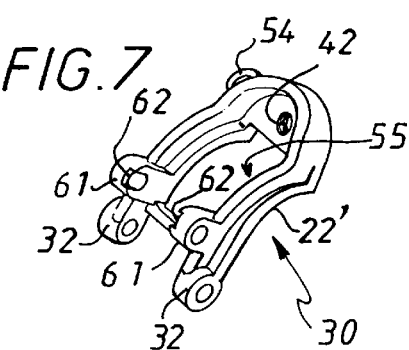
FIG. 7 is a perspective view of the closure clamp as seen from the rear.
Figure 8:
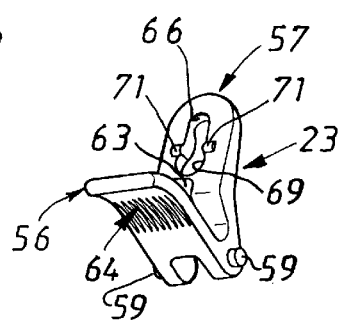
FIG. 8 is a perspective view of the clamping system also forming part of the suspension clamp, as seen from the front.
Figure 9:
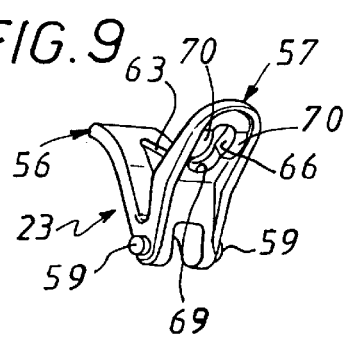
FIG. 9 is a perspective view of the clamping system as seen from the rear.
Figure 10:
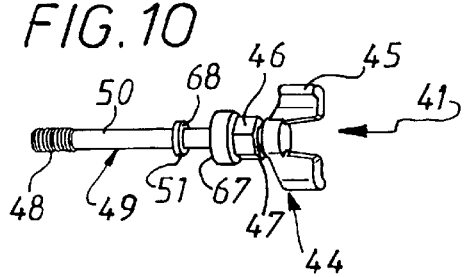
FIG. 10 is a perspective view of the clamping screw controlling the closure clamp and the clamping system of the suspension clamp in accordance with the invention.

The lengthwise direction D of the cradle 22 is shown in dashed line in FIG. 5.

In the various embodiments shown the top part 14A of the suspension clamp 14 is in the form of a substantially flat lug substantially parallel to the lengthwise direction D of the cradle 22 and substantially in the median longitudinal plane of the cradle.

For pivotal cooperation with the bore 19 in the shackle 15 it has two back-to-back journals 24 that are substantially transverse to the lengthwise direction D of the cradle 22.

In the embodiments shown the journals 24 have a common bore 25 and a reinforcing shaft 26 extends inside both of them (see FIG. 2).

In the various embodiments shown the bottom part 14B of the suspension clamp 14 has a substantially circular contour in cross-section and its opening 20 occupies substantially a top quarter of that contour.

The bottom part 14B is externally reinforced by transverse ribs 27 extending continuously from its free end 28 to the face 29 of the top part 14A opposite the latter, merging with the face 29 to form a triangle.

As seen more clearly in FIG. 5, the cradle 22 that it forms is preferably flared outwardly at each end.

In the various embodiments shown the top part 14A and the bottom part 14B of the suspension clamp 14 are in one piece, the combination being moulded together from an insulative synthetic material of high mechanical strength.

The reinforcing shaft 26 is preferably a metal shaft.

In accordance with the invention, and in addition to the clamping system 23, the suspension clamp 14 includes a closure clamp 30 pivoting about an axis A2 parallel to the lengthwise direction D of the cradle 22 and adapted to close the cross-section of the bottom part 14B when required, then extending across the opening 20 of the bottom part 14B, from one end to the other thereof, i.e. from the free end 28 of the bottom part 14B to the end 31 at which it joins onto the top part 14A.

Like the opening 20 of the bottom part 14B, the closure clamp 30 subtends substantially a quarter of a circle, forming an arch 22', completing the cross-section of the bottom part 14B when in its closed position.

In the various embodiments shown the closing clamp 30 is articulated to the bottom part 14B along its free end 28.

In the embodiment more particular shown in FIGS. 1 through 12 the opening 20 in the bottom part 14B of the suspension clamp 14 is on the side of the latter opposite the support 13, and therefore likewise the closure clamp 30.

The closure clamp 30 has, at the end concerned, two lateral articulation lugs 32 inserted in the manner of a yoke into two slots 33 in corresponding relationship provided for this purpose through a rounded bead 34 increasing the thickness of the free end 28 of the bottom part 14B, the combination comprising a longitudinal bore 35 to receive a pin 36 defining the pivot axis A2.

Like the reinforcing shaft 26, the pin 36 is preferably made of metal.

At its free end, i.e. at its end opposite the lugs 32, the closure clamp 30 of the embodiment shown has a bearing lug 38 which is pressed against the top part 14A of the suspension clamp 14 in the closed position.

In accordance with the invention, nesting means 39, 40 are provided in a complementary manner on the suspension clamp 14 and on the closure clamp 30 for cooperation of the nesting means 39, 40 by relative interengagement thereof when the closure clamp 30 is in the closed position.

In the embodiment shown the nesting means 39, 40 comprise at least one boss 39 projecting from the bearing lug 38 of the closure clamp 30 and at least one cavity 40 recessed into the top part 14A of the suspension clamp 14, the cavity being in corresponding relationship to the boss 39 and adapted to receive it.

As in the embodiments shown, the nesting means 39, 40 preferably include two bosses 39 on the bearing lug 38 of the closure clamp 30 and two cavities 40 in corresponding relationship thereto on the top part 14A of the suspension clamp 14.

As shown here, for example, the bosses 39 and the cavities 40 are parallel to the lengthwise direction D of the cradle 22 and have a four-cornered contour when seen in plan view.

In the various embodiments shown the closure clamp 30 is controlled by a clamping screw 41 transverse to the lengthwise direction D of the cradle 22 and adapted to hold the device in the closed position when required.

The clamping screw 41 passes through a bore 42 provided for this purpose in the bearing lug 38 between the bosses 39 and through a bore 43 also provided for this purpose in the top part 14A of the suspension clamp 14.

In practice the clamping screw 41 is the same in the various embodiments shown. As shown here, the head 44 of the clamping screw 41 preferably includes two spaced members 45, 46 for rotating it separated by a frangible area 47.

The rotation member 45 at the free end of the head 44 is a butterfly nut, for example.

The rotating member 46 is a hexagonal nut.

In the embodiment shown the threaded section 48 of the shank 49 of the clamping screw 41 is restricted to its free end and, for reasons that will become apparent below, the smooth section 50 of the shank 49 has a transverse flange 51 between the head 44 and the threaded section 48 at a distance from the head 44.

The clamping screw 41 can be made from an insulative synthetic material, for example. In the embodiment more particularly shown in FIGS. 1 through 12 the head 44 of the clamping screw 41 is on the same side of the top part 14A of the suspension clamp 14 as the closing clamp 30, its shank 49 passes through the closing clamp and, to cooperate with the threaded section 48 of the shank 49, the top part 14A of the suspension clamp 14 has a threaded bush 52 in corresponding relationship to it beyond the bore 43.

In practice the shank 49 of the clamping screw 41 passes through the bore 42 in the closure clamp 30 and in the embodiment shown the bore 42 is threaded to mesh with the end of the threaded section 48 of the shank 49 towards the head 44 of the clamping screw 41.

As shown here, the bore 43 in the top part 14A of the suspension clamp 14 is preferably flared outwardly at the top, forming a truncated cone, to facilitate inserting the clamping screw 41.

The threaded bush 52 leading on from the bore 43 projects from the face 29 of the top part 14A of the suspension clamp 14 opposite the closure clamp 30.

As shown here, the threaded bush 52 is preferably split locally by at least one slot 53 to constitute a brake opposing unintentional unscrewing of the clamping screw 41.

As shown in FIGS. 1 through 12, for example, there is only one slot 53 transverse to the axis of the threaded bush 52.

In the various embodiments shown, the closure clamp 30 incorporates a holding lug 54 to facilitate manipulating it.

As shown here, for example, the holding lug 54 projects laterally and parallel to the lengthwise direction D of the cradle 22.

In the embodiment more particularly shown in FIGS. 1 through 12 the clamping system 23 is articulated to the closure clamp 30 and passes through an opening 55 provided in the closure clamp for this purpose.

The clamping system 23 includes, in a V-shape arrangement, a clamping shoe 56 and an operating lever 57. To mount it so that it can pivot, i.e. here to articulate it to the closure clamp 30, it has two back-to-back journals 59 in the area where the clamping shoe 56 and the operating lever 57 converge, rotationally engaged with lugs 61 in corresponding relationship on the closure clamp 30, flanking its opening 55.

The lugs 61 on the closure clamp 30 for articulating the clamping system 23 in practice project from its back and are relatively near the lugs 32 for articulating it to the bottom part 14B of the suspension clamp 14.

As in the embodiment shown, the lugs 61 of the closure clamp 30 preferably each have a localized notch 62 so that the clamping system 23 can simply be clipped into place.

The clamping shoe 56 of the clamping system 23 and its operating lever 57 are internally connected by a transverse rib 63 to reinforce them.

The clamping shoe 56 has an array of projecting transverse ribs 64 on its exterior to obtain a firmer grip on the overhead electrical power line 10 to be clamped.

The clamping system 23 is in practice the same in the various embodiments shown and is controlled by the same clamping screw 41 as the closure clamp 30, the shank 49 of the closure screw 41 passing freely through a bore 66 provided for this purpose in the operating lever 57, having two shoulders 67, 68 on respective opposite sides of the operating lever 57 for driving it both ways.

In practice the shoulder 67 is formed by the rotation member 46 and the shoulder 68 is formed by the flange 51.

To enable the clamping system 23 to pivot the bore 66 in its operating lever 57 is in the form of an elongate slot transverse to its pivot axis A2 and the bore 66 is key-hole shaped so that the flange 51 on the clamping screw 41 can be passed through it.

In other words, it has an enlargement 69 at one end the diameter of which is greater than that of the flange 51 of the clamping screw 41.

As in the embodiment shown, the operating lever 57 of the clamping system 23 preferably has rounded bosses 70, 71 projecting from both faces and flanking the bore 66 for cooperating contact with the respective shoulders 67, 68 of the clamping screw 41.

As in the embodiments shown, a recess 56' is preferably provided at the bottom of the top part 14A of the suspension clamp 14 and notches out the middle part of the corresponding end 31 of its bottom part 14B. It is adapted to receive the clamping system 23 transversely, to be more precise the end of its clamping shoe 56.

The width of the recess 56' is therefore at least equal to that of the clamping shoe 56 and its height is at least equal to the thickness of the shoe.

A recess 56" of the same kind is provided on the closure clamp 30, at the base of its bearing lug 38 and continuous with its opening 55, and this recess is adapted to receive transversely the clamping system 23, to be more precise the end of its clamping shoe 56.

The suspension 12 in accordance with the invention is preferably shipped assembled and ready for use with its support 13, its shackle 15 and its suspension clamp 14, as shown in FIG. 1.

To use it, it must first be fixed to a post.

This is done in the following manner.

In a first or preparation period during which the suspension clamp 14 is in the open position the clamping screw 41 is unscrewed so that the threaded portion 48 of its shank 49 meshes with the bore 42 in the closure clamp 30 which is threaded for this purpose.

As a result traction is applied to the operating lever 57 of the clamping system 23, via the flange 51 on the smooth portion 50 of the shank 49, which bears through the shoulder 68 on the bosses 71 on the operating lever 57, which pivots the clamping system 23 about its pivot axis A1 in a direction that causes the end of its clamping shoe 56 to enter the recess 56" provided for this purpose at the bottom of the bearing lug 38 of the closure clamp 30.

Unscrewing of the clamping screw 41 is continued until the clamping shoe 56 is completely retracted into the recess 56" and completely uncovers the arch 22' of the closure clamp 30 (see FIG. 11A).

The closure clamp 30 is then left in the open position to enable the overhead electrical power line 10 to be supported to be inserted into the bottom part 14B of the suspension clamp 14, through the opening 20 therein, as shown by an arrow F1 in FIG. 11A.

In a second step (see FIG. 11B), the closure clamp 30 is pivoted about its pivot axis A2 into the closed position, as shown by an arrow F2 in FIG. 11B.

The bearing shoe 38 of the closure clamp 30 then bears against the top part 14A of the suspension clamp 14, with relative interengagement of the nesting means 39, 40 of the closure clamp 30 and the suspension clamp 14.

The end of the clamping shoe 56 of the clamping system 23 enters the recess 56' provided for this purpose at the bottom of the top part 14A of the suspension clamp 14, which advantageously completes transverse and longitudinal locking of the closure clamp 30 to the suspension clamp.

The clamping screw 41 is then screwed a little way into the threaded bush 52, as shown in FIG. 11B.

The axial length of the threaded portion 48 of the shank 49 of the clamping screw 41 is sufficient for the threaded portion 48 to mesh both with the threaded bush 52 of the top part 14A of the suspension clamp 14, at its free end, and with the threaded bore 42 of the closure clamp 30, at the end facing the head 44 of the clamping screw 41, in the closed position of the system shown in FIG. 11B, so that the clamping shoe 56 of the clamping system 23 is held in its retracted position in the recesses 56', 56" and at the same time the clamping flange 30 is held in the closed position on the suspension clamp 14.

In this initial closed position the internal volume of the suspension clamp 14 is totally unimpeded.

The overhead electrical power line 10 then rests on the cradle 42 formed by the bottom part 14B of the suspension clamp 14 due to its own weight and when drawn can slide freely in the cradle 22 in its lengthwise direction D.

When everything has stabilized, the clamping screw 41 is screwed in further.

Figure 11C:
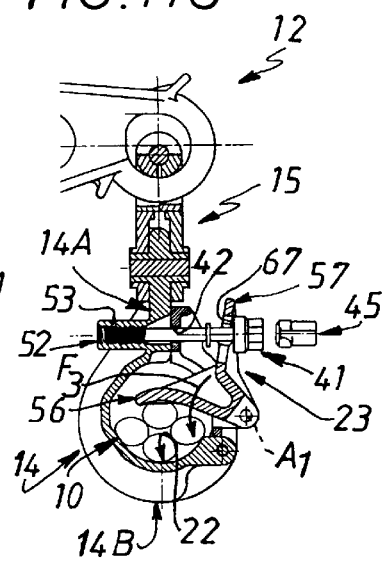

The shoulder 67 on the clamping screw 41 then entrains the operating lever 57 of the clamping system 23 which pivots it about its pivot axis A1, as shown by the arrow F3 in FIG. 11C, causing its clamping shoe 56 to come into contact with the overhead electrical power line 10 and then to press the line strongly against the bottom of the cradle 22, as shown in FIG. 11C for an overhead electrical power line 10 of relatively large diameter.

Figure 12:
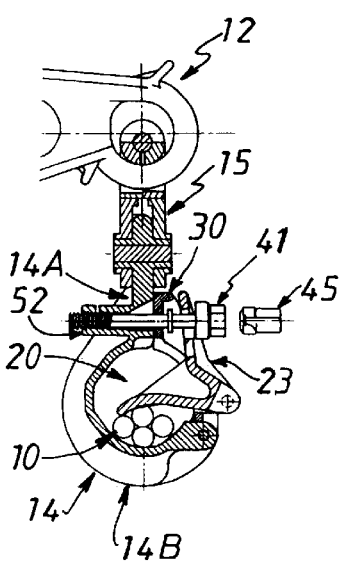
FIG. 12 is a partial elevation view in section similar to that of FIG. 11C for a different diameter of the overhead electrical power line.

The clamping screw 41 is screwed into a greater or lesser degree depending on the diameter of the overhead electrical power line 10 to be suspended, as shown in FIGS. 11C and 12.

In all cases the torque to be applied to the clamping screw 41 increases as the overhead electrical power line 10 is clamped down.

When a particular torque is reached, as determined by the frangible area 47 of the clamping screw 41, the rotation member 45 separates from the screw of its own accord, as shown in FIGS. 11C and 12.

The clamping of the overhead electrical power line 10 is then deemed to be satisfactory.

Because of the design features adopted, the head 44 of the clamping screw 41 is on the opposite side of the suspension clamp 14 to the support 13, which advantageously facilitates operation of the clamping screw 41.

The suspension clamp 14 can be opened again, if required, for example to demount the overhead electrical power line 10 that it contains, by operating the clamping screw 41 using the remaining rotation member 46 provided on it for this purpose.

Upon such opening the clamping screw 41 entrains the clamping system 23 with it in the opposite direction, via the shoulder 68 of its flange 51.

Figure 13:
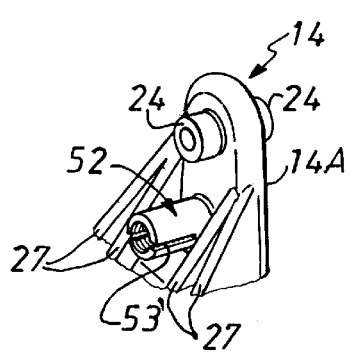
FIG. 13 is a partial perspective view similar to that of FIG. 4 concerning a variant of the suspension clamp in accordance with the invention.
Figure 14:
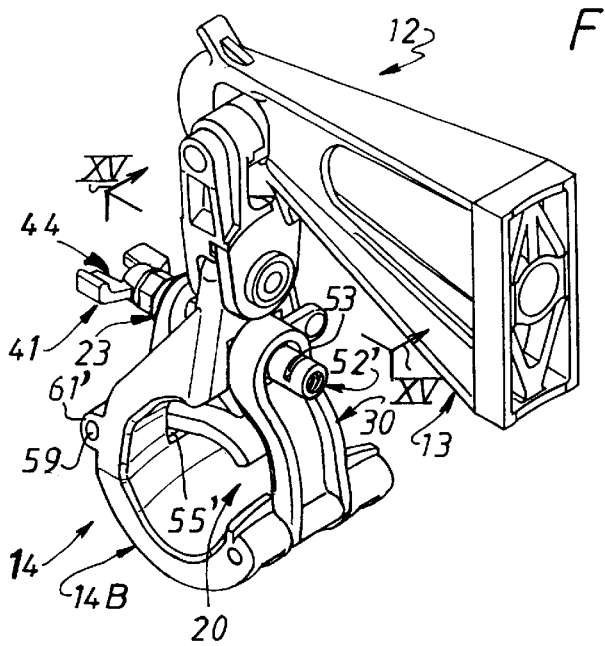
FIG. 14 is a perspective view similar to that of FIG. 1 relating to a variant, as seen from the rear.
Figure 15:
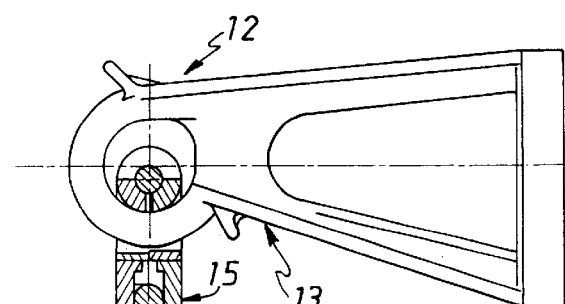
FIG. 15 is, like FIG. 2, a view of this variant partly in elevation and partly in cross-section taken along the line XV—XV in FIG. 14.
Figure 16:
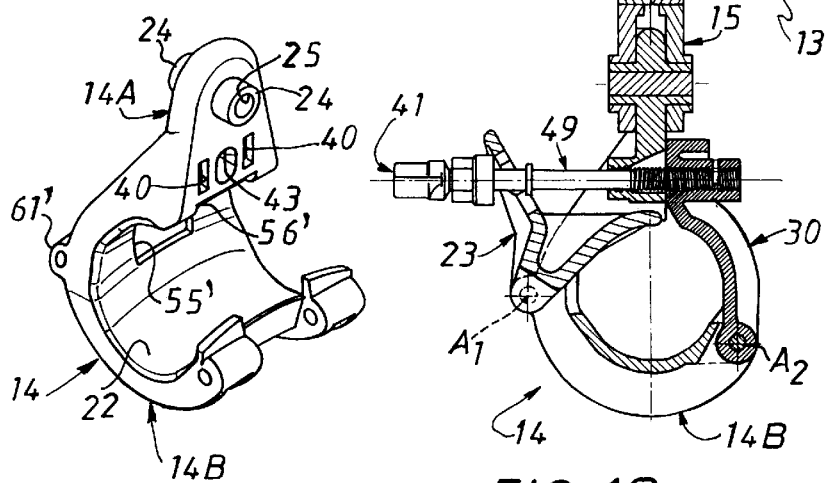
FIG. 16 is a perspective view similar to that of FIG. 3 which relates to the suspension clamp used in this variant.
Figure 17:
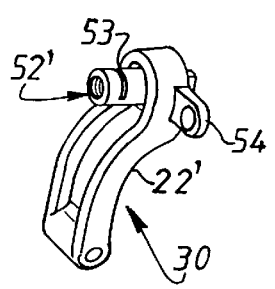
FIG. 17 is a perspective view similar to that of FIG. 7 which relates to the closure clamp.

In the variant shown in FIG. 13 the threaded bush 52 of the suspension clamp 14 is locally split by a slot 53', as previously, to provide a brake, but in this embodiment the slot 53' is a longitudinal slot.

In the variant shown in FIGS. 14 through 17 the opening 20 in the bottom part 14B of the suspension clamp 14 is on the same side as the support 13, and therefore likewise the closure clamp 30.

However, the clamping system 23 is now articulated to the bottom part 14B of the suspension clamp 14 on the side thereof opposite the closure clamp 30 and passes through an opening 55' provided for this purpose in the bottom part 14B.

The head 44 of the clamping screw 41 is on the opposite side of the top part 14A of the suspension clamp 14 to the closure clamp 30, its shank 49 passes freely through the bore 43 in the top part 14A of the suspension clamp 14 and the closure clamp 30 includes a threaded bush 52' to cooperate with the threaded portion 48 of its shank 49.

Because of this reversing of the design features relative to those previously described, the head 44 of the clamping screw 41 is advantageously on the side of the suspension clamp 14 opposite the support 13.

For mounting the clamping assembly 23 so that it can pivot the bottom part 14B of the suspension clamp 14 has two lugs 61' on the back rotationally engaged with the journals 59 of the clamping system 23.

Otherwise, the design features are generally of the same kind as those previously described.

In particular, the lugs 61' of the suspension clamp 14 each have a notch (not visible in the figures) to enable the clamping system 23 to be simply clipped into place.

Also, the top part 14A of the suspension clamp 14 again includes, as previously, a recess 56' at the bottom to receive the end of the clamping shoe 56 of the clamping system 23.

In the embodiment shown, however, the closure clamp 30 does not have any comparable recess 56".

A recess could be provided in it if required, however.

Figure 18:
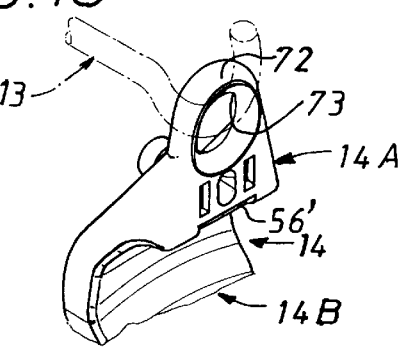
FIG. 18 is a partial perspective view similar to that of FIGS. 3 and 16 and relates to another variant of the suspension clamp in accordance with the invention.

In the variant shown in FIG. 18, as shown in chain-dotted outline, the support 13 is a simple hook.

The top part 14A of the suspension clamp 14 then includes an eyelet 72 for suspending it.

As shown here, the eyelet 72 is preferably reinforced internally by a metallic coating 73.

Of course, the present invention is not limited to the embodiments described as shown but encompasses any variant execution and/or combination of the various component parts thereof.

There is claimed:

1. A suspension clamp for overhead electrical power lines which comprises: a top part, adapted to be suspended from a support, and a bottom part adapted to receive at least a portion of an overhead electrical power line to be suspended, said bottom part having an open cross-section and below its opening forming an elongate cradle with, a clamping system pivoting about an axis parallel to a lengthwise direction of said cradle, which clamp includes a closure clamp pivoting about an axis parallel to said lengthwise direction of said cradle and adapted to close the cross-section of said bottom part when required; said closure clamp being under the control of a clamping screw transverse to said lengthwise direction of said cradle and adapted to hold it in a closed position when required; and said clamping system including an operating lever and being under the control of said clamping screw.

2. The suspension clamp claimed in claim 1 wherein said closure clamp is articulated to said bottom part along its free end.

3. The suspension clamp claimed in claim 2 wherein said closure clamp has a bearing lug at its free end adapted to be pressed against said top part in its closed position.

4. A suspension clamp as claimed in claim 1 wherein a plurality of nesting means are provided in a complementary manner on the suspension clamp and on said closure clamp to cooperate through relative interengagement of said plurality of nesting means with each other when said closure clamp is in its closed position.

5. The suspension clamp claimed in claim 4 wherein said plurality of nesting means between the suspension clamp and said closure clamp include at least one boss projecting from a bearing lug of said closure clamp and at least one cavity recessed into said top part in corresponding relationship with said boss and adapted to receive said boss.

6. The suspension clamp claimed in claim 5 wherein said plurality of nesting means between the suspension clamp and said closure clamp include two bosses on said bearing lug of said closure clamp and two cavities in corresponding relationship thereto on said top part.

7. The suspension clamp claimed in claim 1 wherein said clamping screw has a head, said closure clamp has a bearing lug at its free end adapted to be pressed against said top part in its closed position and said clamping screw passes through said bearing lug of said closure clamp and said top part.

8. The suspension clamp claimed in claim 7 wherein said head of said clamping screw is on the same side of said top part as said closure clamp, the shank of the clamping screw passes through a bore provided for this purpose in said bearing lug of said closure clamp and, for cooperation with a threaded portion of said shank, said top part has in corresponding relation to it a threaded portion.

9. The suspension clamp claimed in claim 8 wherein said bore of said closure clamp is threaded and the axial length of said threaded portion of said shank of said clamping screw is sufficient for said threaded portion in an initial closed position to be engaged both with said threaded bush of said top part at its free end and with said bore in said closure clamp at the end towards said head of said clamping screw.

10. The suspension clamp claimed in claim 8 wherein said threaded bush is split locally by at least one slot.

11. The suspension clamp claimed in claim 7 wherein said head of said clamping screw is on the opposite side of said top part to said closure clamp, the shank of the clamping screw passes through said top part and, for cooperation with said threaded portion of said shank, said closure clamp includes a threaded bush.

12. The suspension clamp claimed in claim 1 wherein said clamping screw has a head with two spaced rotation members separated from each other by a frangible area.

13. The suspension clamp claimed in claim 1 wherein said closure clamp has a holding lug.

14. The suspension clamp claimed in claim 13 wherein said holding lug of said closure clamp projects laterally.

15. The suspension clamp claimed in claim 1 wherein said clamping system is articulated to said closure clamp and passes through an opening provided therein.

16. The suspension clamp claimed in claim 15 wherein said clamping screw has a head which is on the same side of said top part as said closure clamp, the shank of the clamping screw passes through a bore provided in said bearing lug of said closure clamp and, for cooperation with said threaded portion of said shank, said top part has in corresponding relation to it a threaded portion, and a recess adapted to receive said clamping system is provided on said closure clamp at the base of its bearing lug in continuity with its opening.

17. The suspension clamp claimed in claim 15 wherein a recess adapted to receive said clamping system is provided at the base of said top part.

18. The suspension clamp claimed in claim 15 wherein the shank of said clamping screw passes freely through its operating lever and has two shoulders on respective opposite sides thereof for driving said shank both ways.

19. The suspension clamp claimed in claim 18 wherein to cooperate by contact with said shoulders of said clamping screw said operating lever of said clamping system has projecting rounded bosses.

20. The suspension clamp claimed in claim 15 wherein said clamping system includes laterally two journals rotatably engaged with lugs, said lugs each having a notch enabling said clamping system to be fitted by simply clipping it into place.

21. The suspension clamp claimed in claim 15 wherein said clamping system includes laterally two journals rotatably engaged with lugs, said lugs each having a notch enabling said clamping system to be fitted by simply clipping it into place.

22. The suspension claimed in claim 21 wherein said support is a bracket and said suspension clamp is coupled to said support by means of a shackle.

23. The suspension claimed in claim 21 wherein a head of said clamping screw controlling said closure clamp of said suspension clamp is on the opposite side of said suspension clamp to said support.

24. The suspension clamp claimed in claim 1 wherein said clamping system is articulated to said bottom part on the opposite side thereof to said closure clamp and passes through an opening provided in said bottom part for this purpose.

25. The suspension clamp claimed in claim 24 wherein a recess adapted to receive said clamping system is provided at the base of said top part.

26. The suspension clamp claimed in claim 24 wherein the shank of said clamping screw passes freely through its operating lever and has two shoulders on respective opposite sides thereof for driving said shank both ways.

27. The suspension clamp claimed in claim 26 wherein to cooperate by contact with said shoulders of said clamping screw said operating lever of said clamping system has projecting rounded bosses.

28. The suspension clamp claimed in claim 1 wherein said cradle formed by said bottom part flares outwardly at each end.

29. The suspension clamp claimed in claim 1 wherein its top part includes two journals for suspending it, said journals have a common bore and a reinforcing shaft extends internally from one journal to the other.

30. The suspension clamp claimed in claim 1 wherein its top part includes an eyelet for suspending it and said eyelet is reinforced internally by a metallic coating.

31. A suspension for an overhead electrical power line including a support and a suspension clamp suspended from the support either directly or indirectly, wherein said suspension clamp is a clamp as claimed in claim 1.

* * * * *